United States Patent
Lin et al.

(10) Patent No.: US 8,678,673 B2
(45) Date of Patent: Mar. 25, 2014

(54) OPTICAL USB THIN CARD

(75) Inventors: Chien-Hong Lin, Hsinchu County (TW); Yuan-Heng Sun, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 32 days.

(21) Appl. No.: 13/223,568

(22) Filed: Sep. 1, 2011

(65) Prior Publication Data

US 2012/0057867 A1 Mar. 8, 2012

Related U.S. Application Data

(60) Provisional application No. 61/380,569, filed on Sep. 7, 2010.

(30) Foreign Application Priority Data

Jul. 19, 2011 (TW) .............................. 100125408 A

(51) Int. Cl.
- *G02B 6/36* (2006.01)
- *G02B 6/12* (2006.01)
- *G02B 6/38* (2006.01)
- *H04J 14/00* (2006.01)
- *H04B 10/12* (2011.01)
- *H01R 13/44* (2006.01)
- *H01R 13/625* (2006.01)

(52) U.S. Cl.
USPC ................... 385/89; 385/14; 385/55; 385/75; 385/88; 398/43; 398/141; 439/131; 439/676

(58) Field of Classification Search
USPC ............. 385/14, 24, 55, 75, 88, 89, 129–132; 398/43, 115, 117, 141; 439/131, 135, 439/141, 142, 676; 710/62, 63, 104; 711/103
See application file for complete search history.

(56) References Cited

U.S. PATENT DOCUMENTS 7,324,757 B2 1/2008 Wilson et al.
7,440,286 B2 10/2008 Hiew et al.
(Continued)

FOREIGN PATENT DOCUMENTS

CN 101147088 3/2008
CN 101345358 1/2009
(Continued)

OTHER PUBLICATIONS

Intel, "Light Peak-USB 4.0/3.0 ", "Beijing Forum Apr. 15, 2011", 2010 Intel Corporation.
China Patent Office, Office Action, May 2, 2013.
Taiwan Patent Office, "Office Action", Dec. 2, 2013.

*Primary Examiner* — K. Cyrus Kianni
*Assistant Examiner* — Hung Lam
(74) *Attorney, Agent, or Firm* — WPAT, PC; Justin King

(57) ABSTRACT

Exemplary embodiments of optical USB thin card is disclosed, which includes a substrate, having a space formed inside its packaging layer; a seat, disposed at a position on the substrate while forming an opening on the substrate; a plurality of first contact elements, each being disposed on the seat to be used for connecting electrically with an external device; a plurality of second contact elements, each being disposed on the seat to be used for connecting electrically with an external device; and bidirectional optical transmission module, having a plurality of optical fiber, disposed inside an accommodation space formed by the enclosure of the seat and the substrate; a micro control unit, for processing signals, data and commands of the optical USB thin card.

15 Claims, 11 Drawing Sheets

(56) References Cited

U.S. PATENT DOCUMENTS

| | | |
|---|---|---|
| 7,572,071 B1 | 8/2009 | Wu et al. |
| 2008/0320207 A1* | 12/2008 | Ma et al. ............... 711/103 |
| 2009/0093136 A1 | 4/2009 | Hiew et al. |
| 2009/0216922 A1 | 8/2009 | Park et al. |
| 2010/0150572 A1 | 6/2010 | Lee et al. |
| 2010/0278490 A1* | 11/2010 | Liao et al. ............... 385/90 |

FOREIGN PATENT DOCUMENTS

| | | |
|---|---|---|
| CN | 101752686 | 6/2010 |
| CN | 201497817 | 6/2010 |
| TW | M371340 U1 | 12/2009 |

\* cited by examiner

OPTICAL USB THIN CARD

TECHNICAL FIELD

The present disclosure relates to an optical universal-serial-bus (USB) thin card.

TECHNICAL BACKGROUND

With the increasing popularity of multimedia audio/video apparatuses, including digital cameras, MP3 players, USB flash cards, digital camcorders, notebook computers, tablet computers, smart phones, and coming cloud computing devices, the demand for memory cards of massive data storage capacity is increasing year by year as well. However, despite the ability to store mass data therein, most such memory cards of massive data storage capacity that are available today can not transfer data faster enough for enabling multimedia contents that are stored in the memory cards to be played smoothly on common multimedia audio/video apparatuses. Hence, it is required to have an improved memory card overcoming the aforesaid shortcoming.

In view of those thin-card USB memory sticks whichever has a plurality of electronic components embedded therein, such as the USB device disclosed in U.S. Pat. No. 7,440,286 which can be an integrated chip-on-board (COB) device having a considerable amount of electronic components, chips and solder joints built therein, those components that are already built inside the COB device can most likely be reheated by the heat generated from a soldering process for connecting the COB device to a connector, and may be displaced or even damaged.

There are many card-type memory devices or products that are already available on the market, such as microSD, slim-type USB memory card, etc. Since those card-type memory devices are generally being produced using semiconductor process, the metal plates that are built inside such card-type memory devices are usually being integrally formed in the process if such metal plates are planar metal plates. However, if there are non-planar plates, such as metallic reeds or metallic elastic pieces that are manufactured by stamping, whichever is to be built inside the card-type memory devices, the process for producing such card-type memory devices may be very complicated since they may not be integrally formed using the semiconductor process.

Recently, a technique of silicon photonic link is disclosed in Intel Developer Forum, by that data transfer rate can be increased from 4.8 G bps of USB 3.0 standard to 10 G bps, or even reaching 1 TB bps, and consequently the problem of unable to transfer data faster enough that troubles those memory cards of massive data storage capacity can be solved.

With the maturing of optical technology, especially in the fields relating to the production of semiconductor laser, light amplifier and optical filter, the technology of dense wavelength division multiplexing (DWDM) is rapidly advancing as well so as to achieve a high-capacity versatile broadband service. Thereby, under an optical fiber communication architecture that is currently available, the band width for data transmission can be increased by 16 times, 32 times, 64 times or even 128 times.

In stead of adopting those expensive and difficult-to-process materials as other conventional processes did, the siliconization DWDM process of silicon photonics link technology is designed to utilize beams produced by Si chips that are low in manufacture cost and easy to fabricate, and thus can be used as base for developing new optical fiber data transmission technology. On the other hand, although there is already a technology for transmitting data through laser that is currently available and had been adopted by some telecommunication service companies and other industries, the corresponding laser devices are too expensive and too bulky to be applied in common personal computers so as to be popular. Nevertheless, considering the long-term technological development and utilization of siliconizing photonics, the 50 G bps silicon photonics link technology incorporating the technique of hybrid silicon laser is indeed a major progress for achieving a high-bandwidth, low-cost optical communication system that can be used for networking the devices including personal computers, servers, household appliances, etc.

Accordingly, there has a need for developing a thin card devices whose transfer rate can be expected to achieve a speed of 10 G bps or even higher.

TECHNICAL SUMMARY

In an exemplary embodiment disclose an optical universal-serial-bus (USB) thin card, comprising: a substrate, having a packaging layer formed thereon; a seat, disposed at a position on the substrate while enabling at least one opening and an accommodation space to be formed by the enclosure of the seat and the substrate, further comprising: a plurality of first contact elements, each being disposed on the seat; and a plurality of second contact elements, each being disposed on the seat at a position other than those of the first contact elements; a bidirectional optical transmission module, having a plurality of optical fiber, disposed inside the accommodation space while allowing the same to transmit optical data through the at least one opening formed between the seat and the substrate as its data transmission/receiving path; a micro control unit, for processing and controlling signals, data and commands of the optical USB thin card; and a function unit, for providing functionalities including at least one of storing, communication, or inputting-and-outputting.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

The present disclosure relates to an optical USB thin card, such as a slim-type USB memory card with bidirectional optical transmission module, being a USB thin card having an optical signal transceiving module to be integrated on the same printed circuit board with connectors and alignment pins/holes, and thereby, capable of utilizing the comparatively faster data transmission speed enabled by the optical signal transceiving module for achieving a transfer rate faster than the USB 3.0 standard and reaching a transfer rate of 10 G bps or even faster.

Figure 1A:
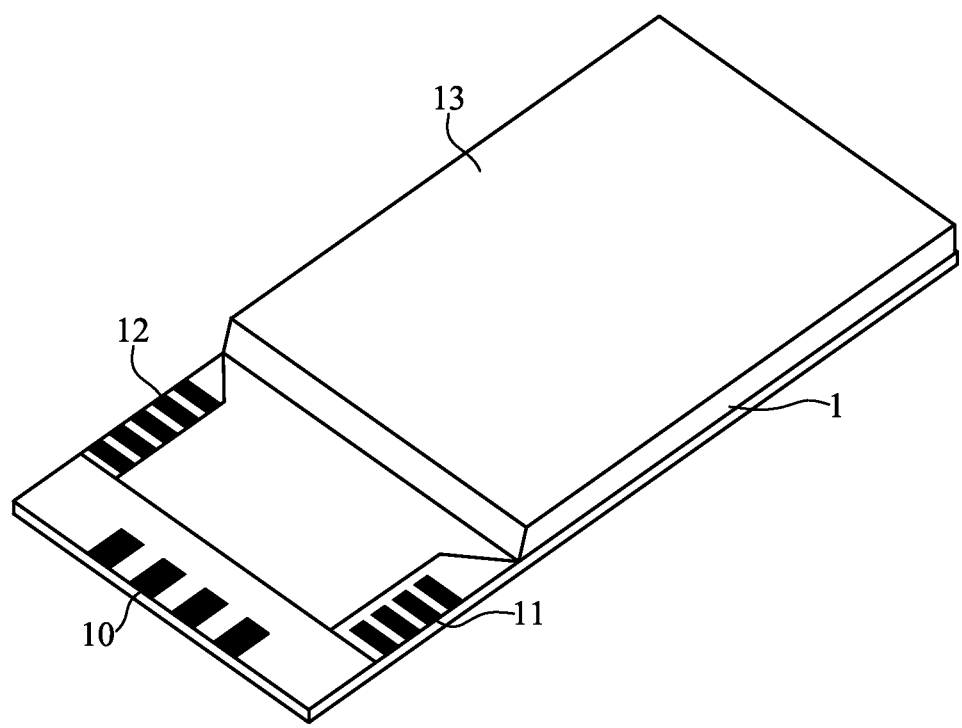
FIG. 1A is a schematic diagram showing a substrate used in an exemplary embodiment of optical USB thin card of the present disclosure.
Figure 1B:
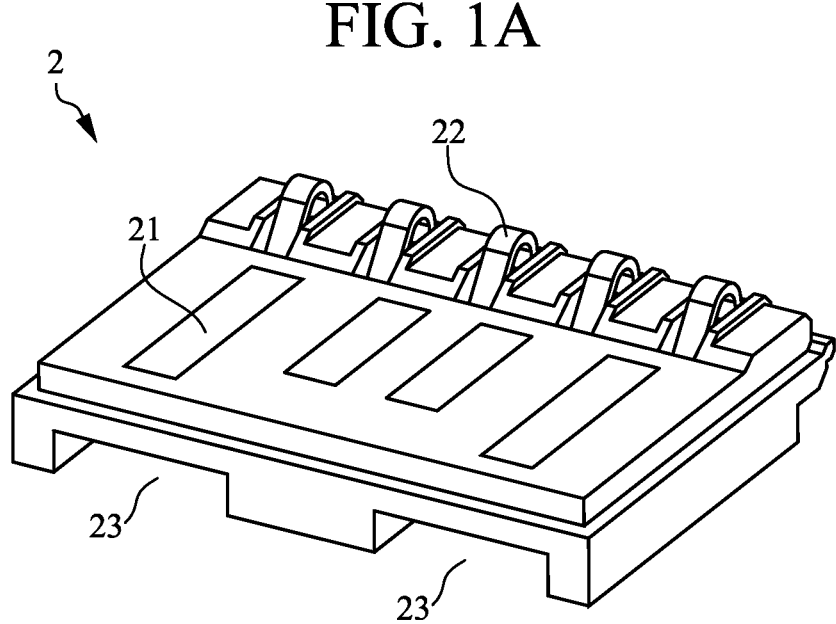
FIG. 1B is a schematic diagram showing a seat used in an exemplary embodiment of optical USB thin card of the present disclosure.
Figure 1C:
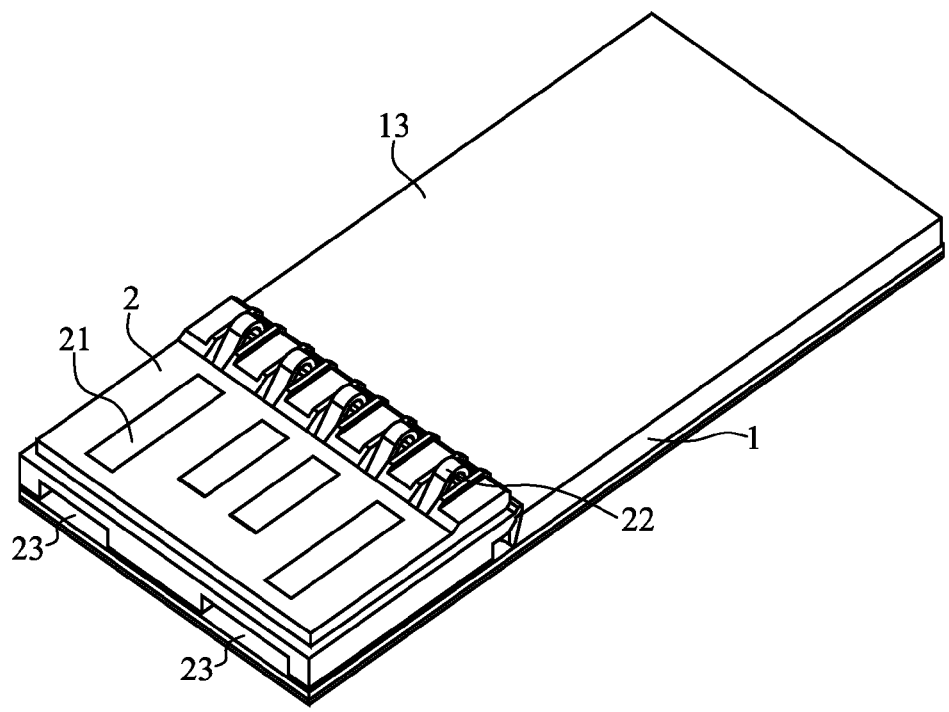
FIG. 1C is a schematic diagram showing an exemplary embodiment of optical USB thin card of the present disclosure.

Please refer to FIG. 1A, which is a schematic diagram showing a substrate used in an optical USB thin card according to an exemplary embodiment of the present disclosure. In FIG. 1A, the substrate 1 is configured with a set of electro-optic bonding pads 10, a set of first bonding pads 11, a set of second bonding pads 12 and a package layer 13, in which the set of the electro-optic bonding pads 10 is used as electrical contacts that are provided for engaging with an optical module responsible for transceiving optical signals; each of the first bonding pads 11 can substantially be an electrical contact of USB 2.0 standard and there is a total of four such first bonding pads 11 in the embodiment; and each of the second bonding pads 12 can substantially be an electrical contact of USB 3.0 standard and there is a total of five such second bonding pads 12 in the embodiment. In addition, as shown in FIG. 1A, the set of the electro-optic bonding pads 10 is arranged at the front of the substrate 1 while allowing the set of the first bonding pads 11 and the set of the second bonding pads 12 to be dispose respectively at the two sides of the substrate 1. Consequently, a bidirectional optical transmission module can be arranged in a space sandwiching between the set of the first bonding pads 11 and the set of the second bonding pads 12 since there can be sufficient space available on the substrate for disposing any bidirectional optical transmission module using this circuit layout. As shown in FIG. 1F, a bidirectional optical transmission module is designed to engage electrically with the electro-optic bonding pads 10 through the electrical contacts 421 formed thereat. Please refer to FIG. 1B, which is a schematic diagram showing a seat used in an optical USB thin card according to an exemplary embodiment of the present disclosure. In FIG. 1B, a seat 2 is configured with a plurality of first contact elements 21 and a plurality of second contact elements 22 respectively at positions corresponding to the first bonding pads 11 and the second bonding pads 12. In this embodiment, each of the second contact elements can be a metal bonding pad or a spring terminal that is formed with a height allowing its top to be positioned higher than that of the first contact elements 21 and thus can be used for enabling an USB 3.0 electrical connection with an application host. As shown in FIG. 1B, the seat is designed to be mounted on the substrate at a position where is not occupied by the package layer 13, that is, it is mounted above the first and the second bonding pads 11, 12 while allowing the first contact elements 21 to connect electrically to the first bonding pads 11 and the second contact elements 22 to connect electrically to the second bonding pads 12. Please refer to FIG. 1C, which is a schematic diagram showing an optical USB thin card according to an exemplary embodiment of the present disclosure. As shown in FIG. 1C, by the enclosure of the seat 2 and the substrate 1, there can be at least one opening 23 to be formed therebetween and each opening 23 can be provided for accommodating a bidirectional optical transmission module as the USB thin card is designed to have a bidirectional optical transmission module to be positioned between the first bonding pads and the second bonding pads so as to optimizing the space utilization of the optical USB thin card.

Figure 1D:
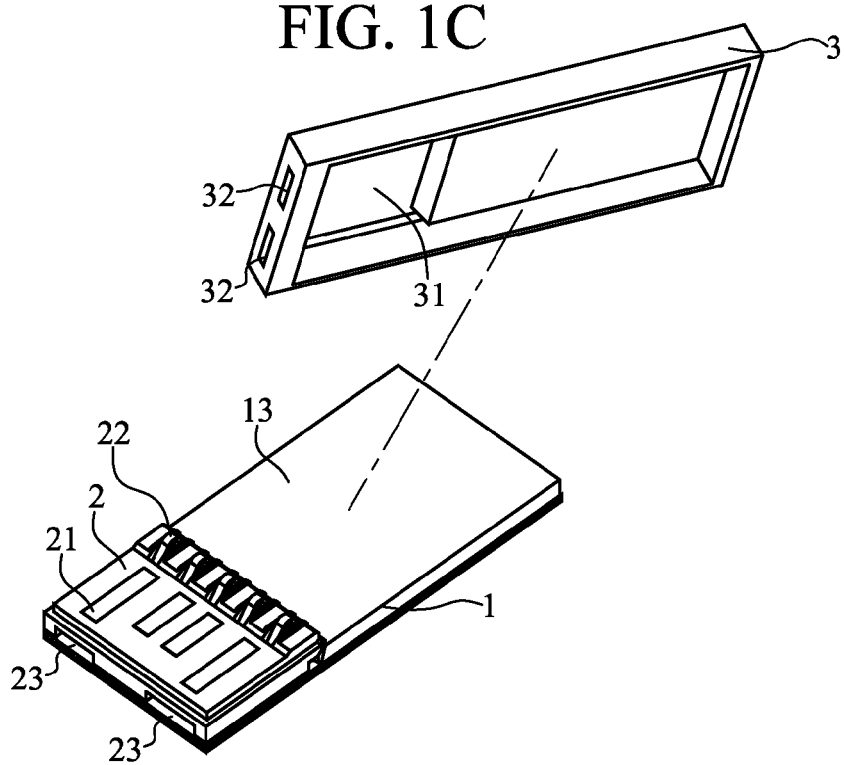
FIG. 1D is an exploded diagram showing the optical USB thin card of FIG. 1C and a cap that is used for covering the optical USB thin card.
Figure 1E:
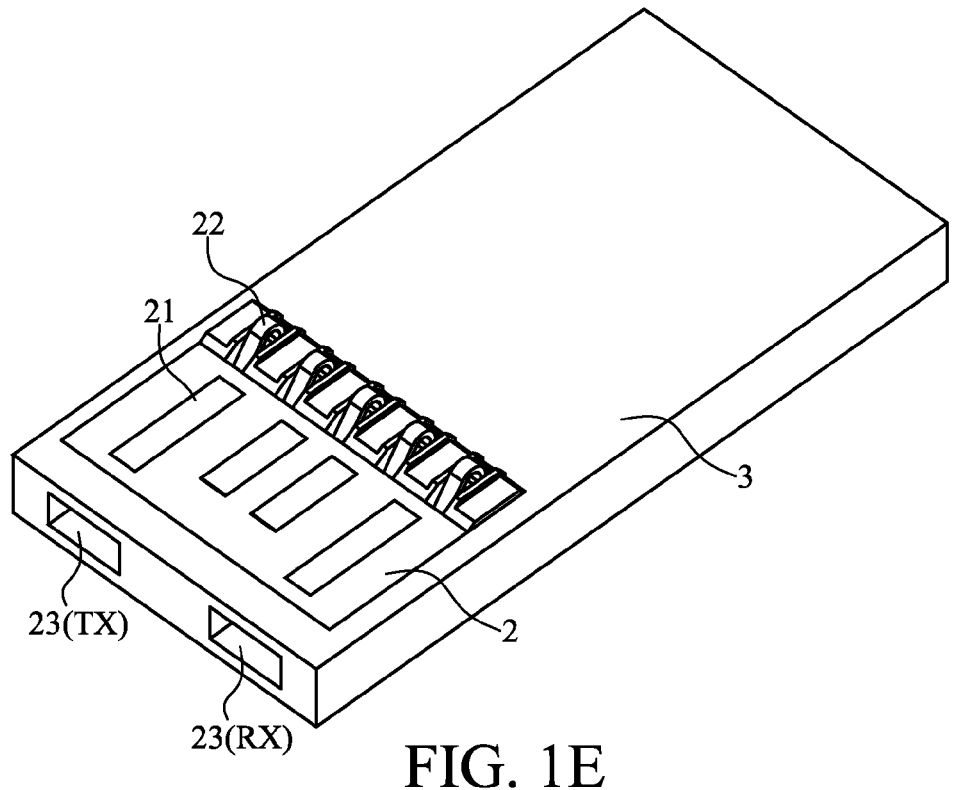
FIG. 1E is a schematic diagram showing the optical USB thin card that is covered by the cap of FIG. 1D.
Figure 1F:
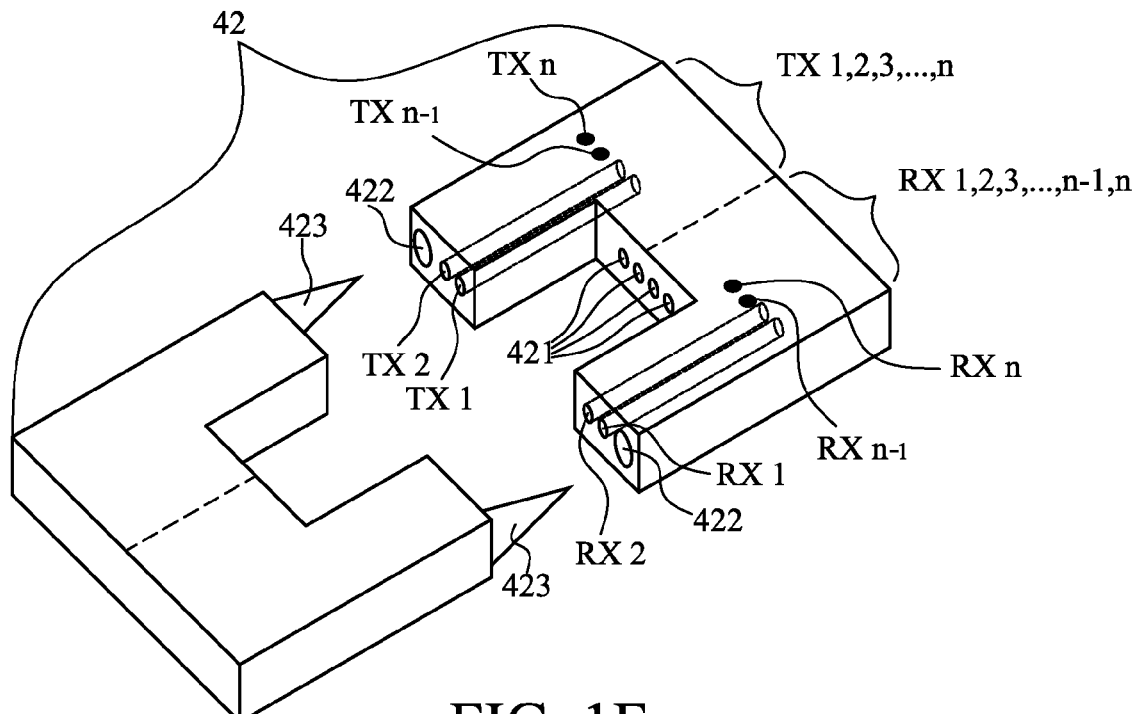
FIG. 1F is a schematic diagram showing a bidirectional optical transmission module used in an exemplary embodiment of optical USB thin card of the present disclosure.

As shown in FIG. 1D and FIG. 1E, the assemble of the seat 2 and the substrate 1 is covered by a cap 3 into an integrated unit, and as there are a window 31 and at least one hole 32 formed respectively at positions corresponding to the first and second contact elements, and the opening 23, i.e. the window is formed on top of cap 3 while the holes 32 are formed in front of the cap 3 in this embodiment, by that the first and second contact elements as well as the opening 23 are exposed to be accessible.

Please refer to FIG. 1F, which is a schematic diagram showing a bidirectional optical transmission module used in an exemplary embodiment of an optical USB thin card of the present disclosure. As shown in FIG. 1F, the bidirectional optical transmission module 42 is formed with electrical contacts 421 at positions corresponding to the electro-optic bonding pads 10, and by enabling an electrical connection between the electrical contacts 421 and the electro-optic bonding pads 10 while enabling the alignment pins 423 to inset into their corresponding alignment holes 422, the bidirectional optical transmission module 42 is connected electrically with the assemble of the seat 2 and the substrate 1. In this embodiment, the assemble of the seat 2 and the substrate 1 is formed with two openings 23 at positions under the seat 2, by that the bidirectional optical transmission module 42 can be disposed.

Figure 2A:
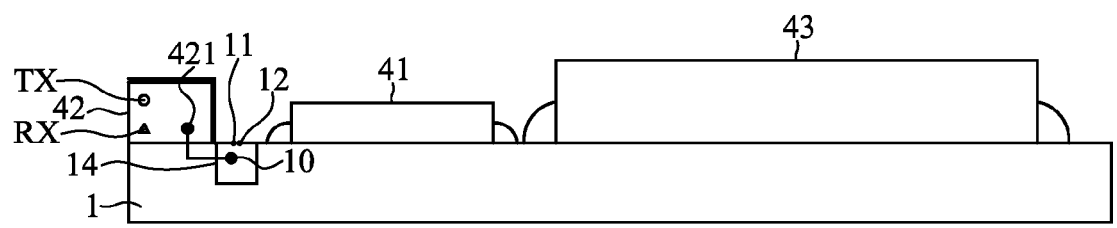
FIG. 2A is a sectional diagram showing a substrate having a plurality of electronic components disposed thereon according to an exemplary embodiment of the present disclosure.
Figure 2B:
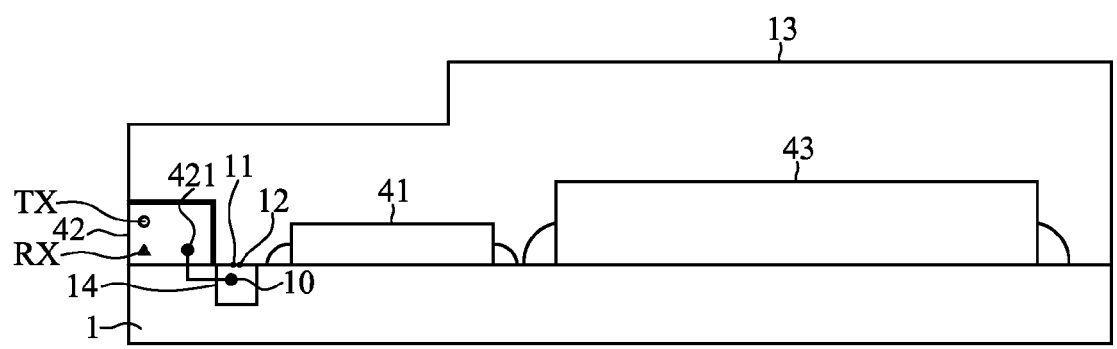
FIG. 2B is a sectional diagram showing the packaging of an optical USB thin card inside a package layer according to an exemplary embodiment of the present disclosure.

Please refer to FIG. 2A and FIG. 2B, which are sectional diagrams showing a substrate having a plurality of electronic components disposed thereon according to an exemplary embodiment of the present disclosure. As shown in FIG. 2A and FIG. 2B, there are a micro control unit (MCU) 41, a bidirectional optical transmission module 42 and a function unit 43 being mounted on the substrate 1 that are arranged to be packaged inside the package layer 13. It is noted that, regarding to the arrangement of the bidirectional optical transmission module 42, it can be mounted on the substrate but 42 while being packaged inside the package layer 13, as shown in FIG. 2B, or it can be mounted on the substrate 1 independently outside the packaging layer 13 without being packaged therein. It is noted that the function unit 43 can be a memory module, a wireless communication module or other I/O modules, and the bidirectional optical transmission module being manufactured using a Si-photonic process for constructing therein a light source capable of emitting beams of various wavelengths, a waveguide, an optic multiplexer, a de-multiplexer, an optical modulator, a photo detector, optical fibers alignment pins and alignment holes. In addition, the light source capable of emitting beams of various wavelengths can be a laser diode capable of emitting various laser beams of different wavelengths.

Figure 2C:
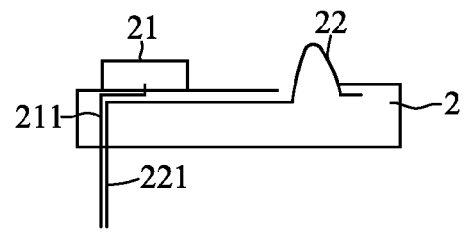
FIG. 2C is a sectional view of a seat used in an exemplary embodiment of optical USB thin card of the present disclosure.
Figure 2D:
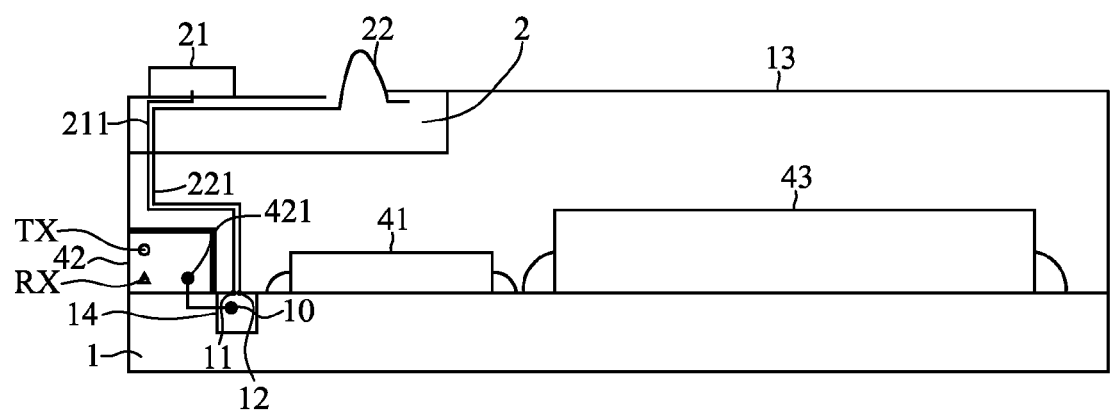
FIG. 2D is a sectional diagram showing the assembling of the seat of FIG. 2C and the packaging of FIG. 2B.

Please refer to FIG. 2C, which is a sectional view of a seat used in an optical USB thin card according to an exemplary embodiment of the present disclosure. As shown in FIG. 2C, each of the first contact elements 21 that is formed on the seat 2 is connected to a connection line 211 and similarly each of the second contact elements 22 is connected to a connection line 221. When the seat 2, as the one shown in FIG. 2C, is integrated with the structure shown in FIG. 2B, the connection lines 211 of the first contact elements 21 will be connected electrically to the first bonding pads 11 while connection lines 221 of the second contact elements 22 will be connected electrically to the second bonding pads 12, as shown in FIG. 2D, by that an optical USB thin card with USB 2.0 and USB 3.0 connection capabilities is achieved. In addition, since the electrical contacts 421 of the bidirectional optical transmission module 42 are also connected to the electro-optic bonding pads 10, the optical USB thin card is equipped with the ability for transceiving optical signals.

Figure 3:
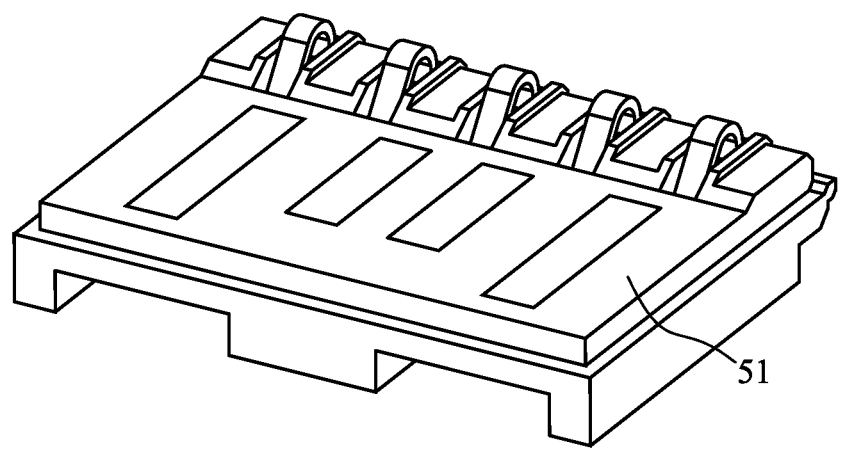
FIG. 3 is a schematic diagram showing a seat without foolproof configuration according to an exemplary embodiment of the present disclosure.
Figure 4A:
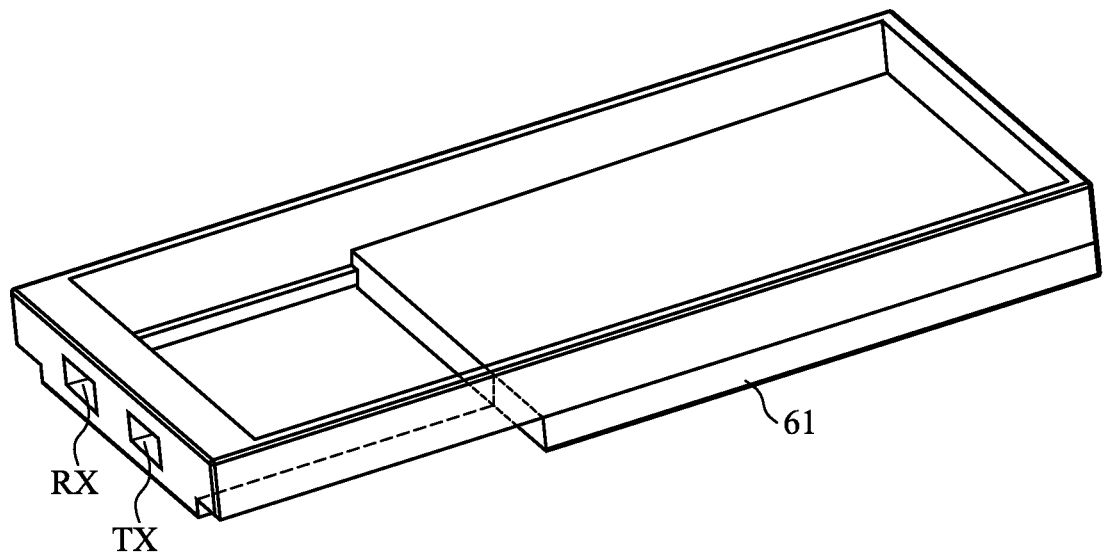
FIG. 4A and FIG. 4B are schematic diagrams showing a cap without and with foolproof configuration separately according to an exemplary embodiment of the present disclosure.
Figure 4B:
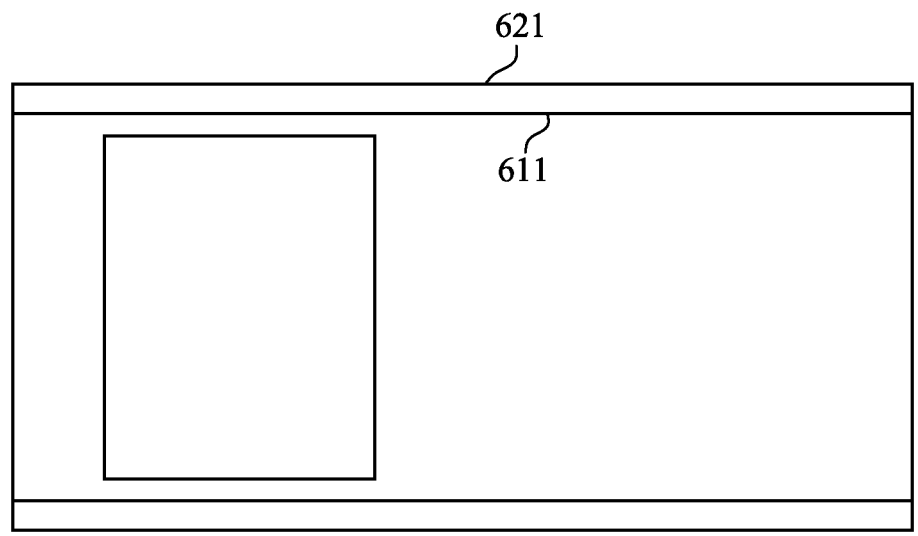

FIG. 3 is a schematic diagram showing a seat without foolproof configuration according to an exemplary embodiment of the present disclosure. FIG. 4A and FIG. 4B are schematic diagrams showing a cap without and with foolproof configuration separately according to exemplary embodiments of the present disclosure. In FIG. 3, a seat 51 used in the USB thin card according to an exemplary embodiment of the present disclosure is not being configured with any foolproof structure. In FIG. 4A, a cap 61 according to an exemplary embodiment is not being configured with any foolproof structure. Instead of that, the cap that is used for covering the assemble of the seat and the substrate can be configured with a foolproof structure, as shown in FIG. 4B. In FIG. 4B, the cap 61 is configured with a foolproof mechanism 611, 612, and the foolproof mechanism 611, 612 is achieved by enabling a step difference to be formed between two opposite sides of the cap, and thereby, the optical USB thin card according to an exemplary embodiment of the present disclosure can be prevented from being inset into a USB port of a computer erroneously in an up-side-down manner.

For achieving the integration of electro-optic components, electronic components, mechanism and electronic packaging on a USB thin card, the present disclosure provides exemplary embodiments of an optical USB thin card, that is designed to be manufactured using a silicon semiconductor process and is composed of three portions, i.e. an electronic circuit portion, an optical module portion and a mechanism portion, which are to be described hereinafter.

The electronic circuit portion comprises: a substrate, having a space formed inside its packaging layer; a seat, disposed at a position on the substrate while forming at least one opening on the substrate; and a micro control unit, for processing and controlling signals, data and commands relating to all the electric signals, optical signals, electro-optic signals communicating in and out, and all operations of the bidirectional optical transmission module and function units of the USB thin card.

In an exemplary embodiment, the electronic circuit portion can be constructed using least the following components: a printed circuit board having a drive circuit formed thereon; a driver IC, for processing and controlling the transceiving of electric signals and optical signals, and also the conversion between electric signals and optical signals; function units, including an I/O module, or WiFi module, or bt module, or GPS module, and/or a storage module, such as a NAND flash memory. The driver IC may have a control unit, for example a micro control unit, to processing and controlling, such as forwarding and receiving data or commands etc. operations.

The optical module portion is substantially a bidirectional optical transmission module, which is disposed inside an accommodation space formed by the enclosure of the seat and the substrate while allowing the same to transmit optical data through the at least one opening formed between the seat and the substrate as its data transmission/receiving path.

Figure 5A:
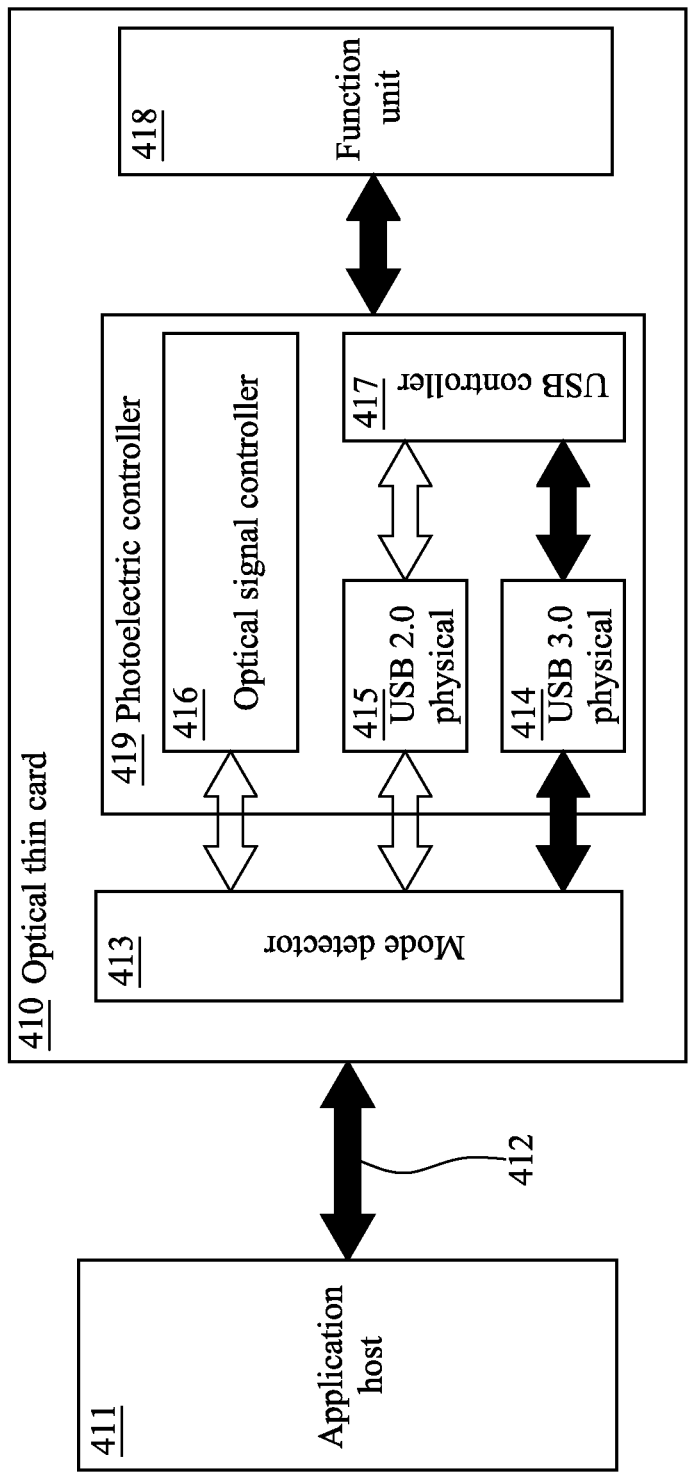
FIG. 5A, FIG. 5B and FIG. 5C are schematic diagrams showing respectively an optical USB thin card whose function unit is operating using USB 3.0 signals, an optical USB thin card whose function unit is operating under USB 2.0 signals, and an optical USB thin card whose function unit is operating using optical signals according to exemplary embodiments of the present disclosure.
Figure 5B:
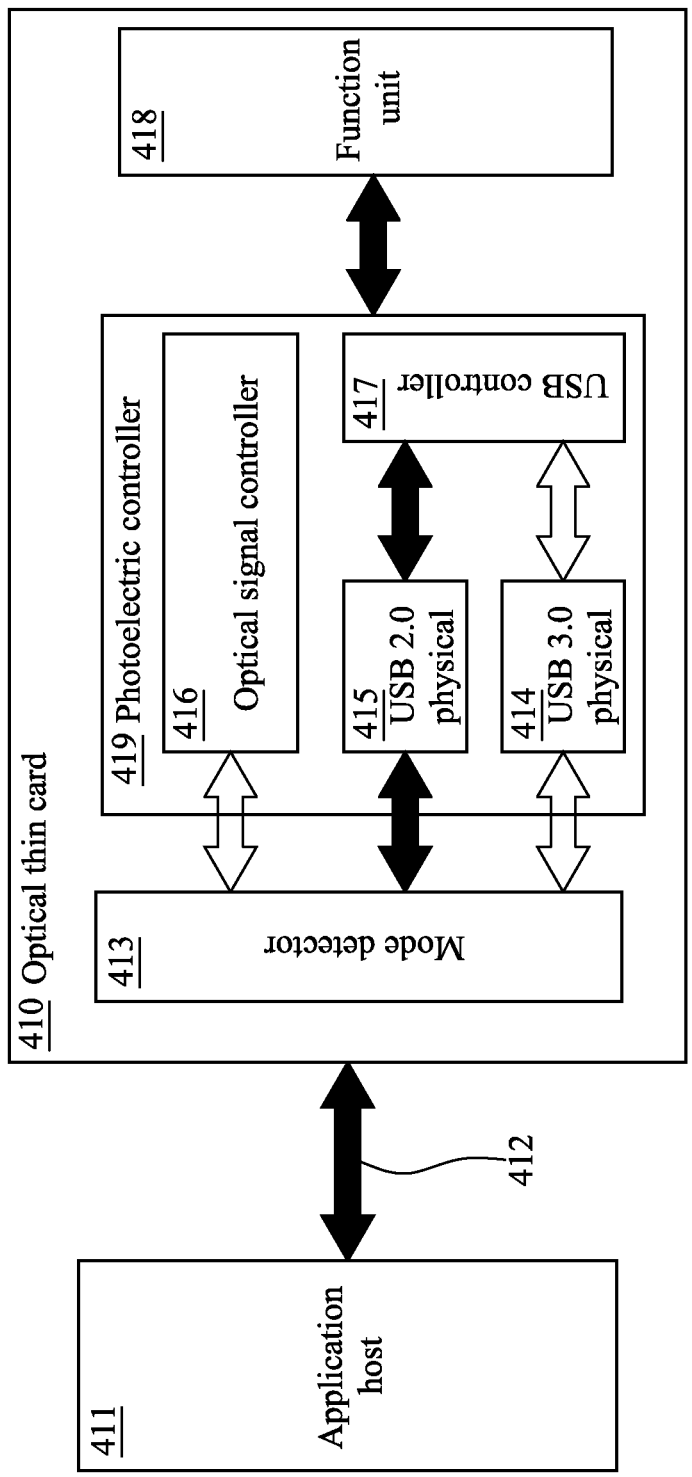
Figure 5C:
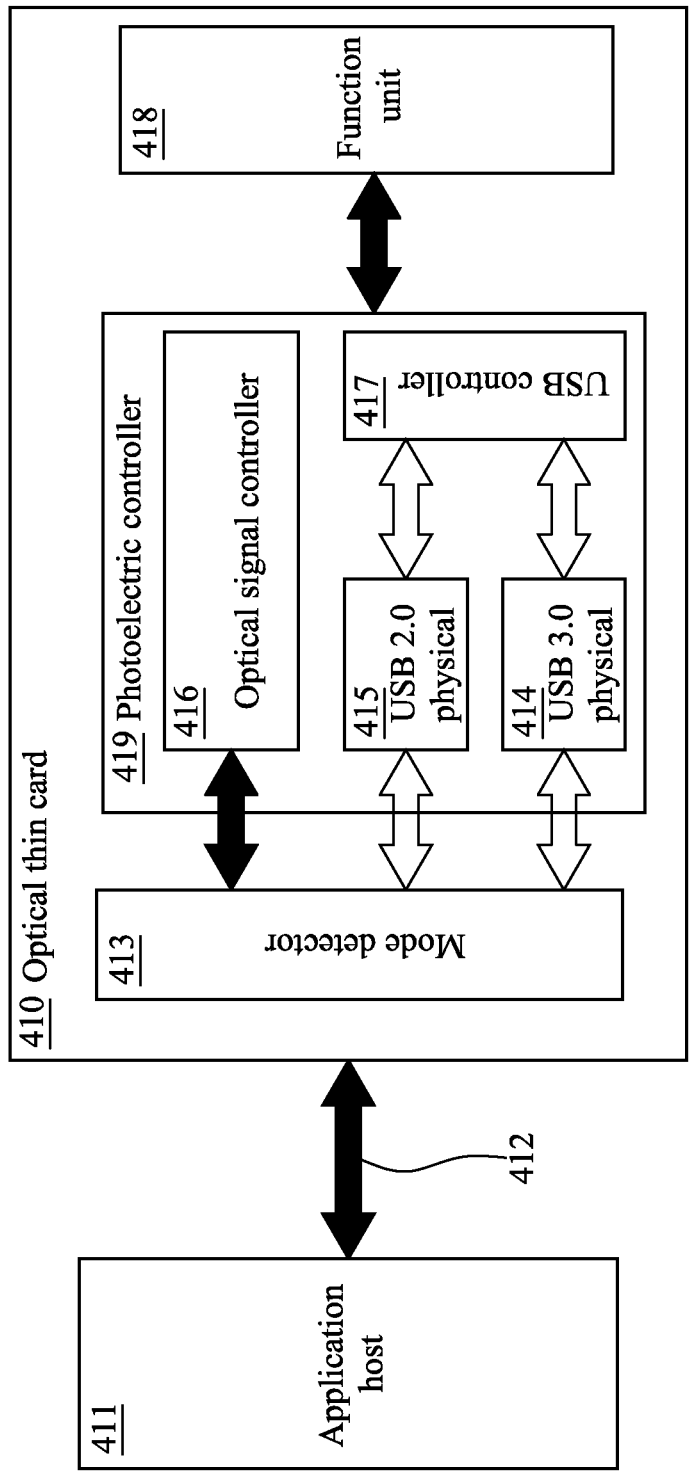

In an exemplary embodiment, the optical module portion can be constructed using the following components:
  a light source, which can be a multiple hybrid silicon laser source that is manufactured by the use of a silicon semiconductor process and capable of emitting hybrid silicon laser beams of different wavelengths, and more particularly, it is a light source with waveguides of different widths and heights that are formed using a lithograph process that is capable of emitting beams of different wavelengths;
  basic light routing, composed of: a waveguide grating, being a set of equal-spaced parallel waveguides for producing beams of different wavelengths or for producing a diffraction spectrum; a plurality of couplers, each being arranged respectively at a front of one corresponding optical signal input terminal for splitting an optical signal inputting therethrough into a number of optical output signals of different wavelengths; and a plurality of silicon-on-insulator waveguides (SOIWGs), being a set of waveguides of different widths and heights that are produced using a lithograph process, for guiding and carrying high-frequency optical waves;
  a plurality of data encoders, each being a silicon modulator manufactured using a silicon semiconductor process that is used for modulating optical waves of different phases into optical waves of different amplitudes;
  a multiplexer (Mux), for converging optical waves of different wavelengths from the plural waveguides while converting the same into optical signals to be fed to optical fibers in respective;
  de-multiplexer, provided for receiving the optical signals from the multiplexer so as to enable the optical signal of different wavelengths to be fed to different optical fibers in respective and then to a photo detector;
  the photo detector, being a photo detector manufactured using a Si-semiconductor process or a photo detector manufactured using a SiGe-semiconductor process, capable of being used for data transmission and detection as a CCD camera, while converting the received optical signals into corresponding electric signals; and a silicon electronic-photonic integrated drive module, being a silicon photonic device having a transmit component (Tx) and a receive component (Rx) integrated therein that is to be used for the transceiving of optical signals, and the conversion between optical signals and electric signal, and as shown in exemplary embodiments FIG. 5A, FIG. 5B and FIG. 5C, the silicon photonic device is comprised of the following components:

a TX module, being an integrated transmitter chip constructed on a silicon substrate using a silicon semiconductor process, to be used for enabling a plurality of different wavelength laser beams, that are emitted from a hybrid silicon laser source and usually in a number of two or more, to be fed into a modulator so as to be coded into corresponding optical signals, and then enabling the beams to be fed to an optical fiber (one channel) after being converged by a Mux in a transfer rate that is 10 G bps at minimum; in the meantime, TX module can have multi optical fiber so that it's possibly reaching 1000 G bps in the near future; and a RX module, being an integrated receiver chip constructed on a silicon substrate using a silicon semiconductor process, to be used for receiving the beams that are obtained after the converged optical signal from the optical fiber is received through a corresponding coupler and then decoded by a corresponding DeMux, while enabling the received beams to be fed to the photo detector so as to be converted into electric signals; meanwhile, RX module can have multi optical fiber (multi channel) for receiving the beams.

Moreover, the mechanism portion is a mechanism comprise of: a plurality of first contact elements, each being disposed on the seat to be used for connecting electrically with an application host; a plurality of second contact elements, each being disposed on the seat to be used for connecting electrically with the application host.

In an exemplary embodiment, the mechanism portion can be constructed using the following components: a plurality of alignment pins and alignment holes, being a plurality of passive aligned pins and passive aligned holes that are used for fixing respectively the transmitting and receiving of beams inside the USB thin card to travel following their specific optical paths so as to prevent the transceiving of beams inside the USB thin card from being scattered, interfered, or refracted by external influence; and a plurality of connectors, including USB 2.0 contact pins and USB 3.0 spring contact pins.

Please refer to FIG. 5A, FIG. 5B and FIG. 5C, which are schematic diagrams showing respectively an optical USB thin card whose function unit is operating using USB 3.0 signals, an optical USB thin card whose function unit is operating under USB 2.0 signals, and an optical USB thin card whose function unit is operating using optical signals according to an exemplary embodiment of the present disclosure. Since the optical USB thin card of the present disclosure is a photo-electronic device 410 with three interfaces, i.e. a USB 2.0 interface, a USB 3.0 interface and an optical signal interface, that can support a multi-mode operation including a transmission in USB 2.0 standard, a transmission in USB 3.0 standard and a transmission using optical signals. Especially the optical signal interface used for enabling the transmission using optical signal is a high-speed, low power interface for allowing a transfer rate higher than 10 G bps. In addition to the USB thin card with high transmission performance, the USB thin card disclosed in the present disclosure also is effective in the prevention of being deformed or damaged in the manufacturing process thereof.

The optical USB thin card 410 of the present disclosure, being a photo-electronic device that is configured with an optical signal interface for allowing a transfer rate higher than 10 G bps, is also configured with a USB 2.0 interface that is capable of supporting a digital transmission at a transfer rate as high as 60 MB/sec. In addition, the optical USB thin card 410 also is configured with a USB 3.0 interface that is capable of supporting a digital transmission at a transfer rate as high as 600 MB/sec. Thus, the optical USB thin card 410 of the present disclosure is a device capable of simultaneously supporting USB 2.0 applications, USB 3.0 applications and application utilizing optical signals.

Taking the optical USB thin card 410 that is enabled to operate under a USB 3.0 mode for example, as shown in FIG. 5A, the optical USB thin card 410 is configured with mode detector 413, a USB 3.0 physical layer 414, a USB 2.0 physical layer 415, an optical signal controller 416, a USB controller 417, a function unit 418 and a photoelectric controller 419, in which the mode detector 413 is enabled to select an operation mode between a USB 2.0 mode, a USB 3.0 mode and an optical signal mode according to the detection thereof. Operationally, as soon as the thin card 410 is insert into a port of an application host 411, such as a notebook computer, a personal computer, a cellular phone, a tablet computer, a personal digital assistant, a digital camcorder or a digital camera, the mode detection will instantly being enabled for detecting whether the signals transmitted between the thin card 412 and the application host 411 are compatible to either USB 2.0 standard or USB 3.0 standard, and if the signal transmission is determined to conform with the USB 3.0 standard, as shown in FIG. 5A, the USB controller 417 will be enabled to selected the USB 3.0 physical layer 414 to be used for transmitting data between the application host 411 and the function unit 418 through the USB bus 412. Moreover, the function unit 418 can be a storage module, such as a NAND flash memory, or an I/O module, and the photoelectric controller 419 can be a system-on-a-chip (SOC) controller.

On the hand, if the signal transmission is determined to conform with the USB 2.0 standard, as shown in FIG. 5B, the USB controller 417 will be enabled to selected the USB 2.0 physical layer 415 to be used for transmitting data between the application host 411 and the function unit 418 through the USB bus 412.

However, if the signal transmission is determined to conform to the protocol of optical signal transmission, as shown in FIG. 5C, the optical signal controller 416 will be enabled to be used for transmitting data between the application host 411 and the function unit 418.

Figure 6:
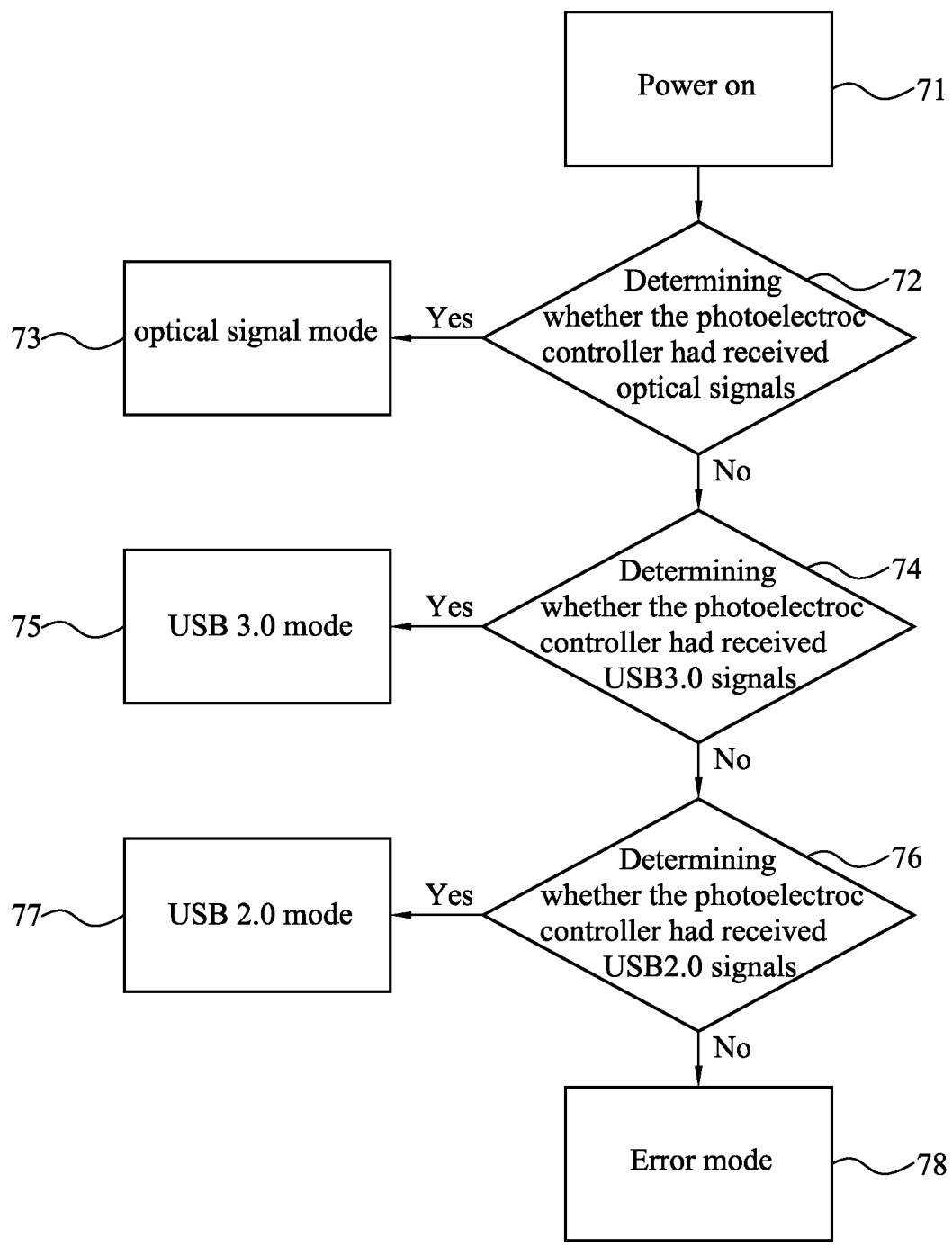
FIG. 6 is a flow chart depicting the operation of an optical USB thin card according to an exemplary embodiment of the present disclosure.

Please refer to FIG. 6, which is a flow chart according to an exemplary embodiment depicting the operation of an optical USB thin card according to an exemplary embodiment of the present disclosure. As soon as the thin card 410 is inserted into a port of an application host 412 so as to be communicate with the application host 412 through the USB bus 412 supporting USB 2.0/USB 3.0/light signal standard, the exemplary steps being performed in the photoelectric controller 419 are as following:

Step 71: power on;

Step 72: determining whether the signals received by the photoelectric controller 419 are optical signals; and if so, the flow proceeds to step 73; otherwise, the flow proceeds to step 74;

Step 73: enabling the USB thin card 410 to operate under the optical signal mode;

Step 74: determining whether the signals received by the photoelectric controller 419 are USB 3.0 signals; and if so, the flow proceeds to step 75; otherwise, the flow proceeds to step 76;

Step 75: enabling the USB thin card 410 to operate under the USB 3.0 mode;

Step 76: determining whether the signals received by the photoelectric controller 419 are USB 2.0 signals; and if so, the flow proceeds to step 77; otherwise, the flow proceeds to step 78;

Step 77: enabling the USB thin card 410 to operate under the USB 2.0 mode; and

Step 78: enabling the USB thin card 410 to enter an error mode.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An optical universal-serial-bus (USB) thin card, comprising:
    a substrate, having a packaging layer formed thereon;
    a seat, disposed at a position on the substrate while enabling at least one opening and an accommodation space to be formed by the enclosure of the seat and the substrate, further comprising:
        a plurality of first contact elements, each being disposed on the seat; and
        a plurality of second contact elements, each being disposed on the seat at a position other than those of the first contact elements;
    a cap, arranged for covering the outside of the assemble of the substrate and the seat;
    a bidirectional optical transmission module, having a plurality of optical fiber, disposed inside the accommodation space while allowing the same to transmit optical data through the at least one opening formed between the seat and the substrate as its data transmission/receiving path;
    a micro control unit, for processing and controlling signals, data and commands of the optical USB thin card; and
    a function unit, for providing functionalities including at least one of storing, communication, or inputting-and-outputting;
    wherein the substrate is further configured with a first bonding pad and a second bonding pad at positions for allowing the two to engage electrically with the first contact elements and the second contact elements in respective.

2. The optical USB thin card of claim 1, wherein each of the plural first contact elements is substantially a conductive bonding pad, and there are total of four conductive bonding pads disposed on the seat.

3. The optical USB thin card of claim 1, wherein each of the plural second contact elements is substantially a conductive spring piece, and there are total of five conductive spring pieces disposed on the seat.

4. The optical USB thin card of claim 1, wherein the cap is configured with or without a foolproof mechanism.

5. The optical USB thin card of claim 1, wherein the substrate is further configured with at least one electro-optic bonding pad to be used for engaging electrically with the bidirectional optical transmission module.

6. The optical USB thin card of claim 1, wherein the bidirectional optical transmission module is manufactured using a Si-photonic process for constructing therein a light source capable of emitting beams of various wavelengths, a waveguide, an optic multiplexer, a de-multiplexer, an optical modulator, a photo detector, optical fibers, alignment pins and alignment holes.

7. The optical USB thin card of claim 6, wherein the light source capable of emitting beams of various wavelengths is substantially a laser diode capable of emitting various laser beams of different wavelengths.

8. The optical USB thin card of claim 6, wherein the function unit is substantially an input/output module.

9. The optical USB thin card of claim 1, wherein the bidirectional optical transmission module is connected to the function unit through the micro control unit.

10. The optical USB thin card of claim 1, wherein the function unit is substantially a memory module.

11. The optical USB thin card of claim 1, wherein the function unit is substantially a wireless communication module.

12. The optical USB thin card of claim 1, wherein each of the plural second contact elements is substantially a conductive ball-shaped bonding pad, and there are total of five conductive ball-shaped bonding pads.

13. The optical USB thin card of claim 1, wherein the micro control unit processing and controlling electrical signals, optical signals, and conversion between the electric signals and optical signals of the optical USB thin card.

14. The optical USB thin card of claim 4, wherein the cap is configured with a foolproof mechanism, and the foolproof mechanism is achieved by enabling a step difference to be formed between two opposite sides of the cap.

15. The optical USB thin card of claim 9, wherein the micro control unit processing and controlling operations of the bidirectional optical transmission module and the function unit.

* * * * *